(12) United States Patent
Chambers

(10) Patent No.: US 6,212,238 B1
(45) Date of Patent: Apr. 3, 2001

(54) SELECTIVE BY-PASS OF ANALOG MODE IN COMMUNICATION BETWEEN DIGITAL DEVICES

(75) Inventor: Paul Chambers, San Jose, CA (US)

(73) Assignee: Philips Electronics North America Corporation, New York, NY (US)

(\*) Notice: Subject to any disclaimer, the term of this patent is extended or adjusted under 35 U.S.C. 154(b) by 0 days.

(21) Appl. No.: 08/994,877

(22) Filed: Dec. 19, 1997

(51) Int. Cl.$^7$ ........................................ H04L 27/00
(52) U.S. Cl. .................. 375/259; 375/216; 375/244; 375/245; 348/446; 348/394
(58) Field of Search .................... 375/259, 216, 375/244, 245; 348/446, 589, 394

(56) References Cited

U.S. PATENT DOCUMENTS

| | | | |
|---|---|---|---|
| 3,781,686 | \* 12/1973 | Ching | 375/245 |
| 3,913,016 | \* 10/1975 | Candy | 375/244 |
| 5,353,119 | \* 10/1994 | Dorricott et al. | 348/446 |
| 5,592,508 | \* 1/1997 | Cooper | 375/216 |

\* cited by examiner

Primary Examiner—Stephen Chin
Assistant Examiner—Shuwang Liu
(74) Attorney, Agent, or Firm—Daniel J. Piotrowski

(57) ABSTRACT

A device having alternative intercommunication formats, and an automated method of selecting the appropriate format to use, in dependence upon the ability of the device to which it is interconnected to utilize this format. Many devices utilize standard analog formats, such as NTSC, PAL, SECAM, and others, to communicate with other devices; many of these devices utilize digital formats, such as MPEG and others, for internal processing or storage. By appending a supplemental signal to the analog signal, the ability of the device to use a digital format can be communicated to the device to which it is interconnected. By communicating their capabilities, devices which have the ability to utilize the same digital format can automatically switch to this digital format for intercommunication, thereby avoiding the signal degradations typically associated with conversions to and from an analog form.

14 Claims, 4 Drawing Sheets

SELECTIVE BY-PASS OF ANALOG MODE IN COMMUNICATION BETWEEN DIGITAL DEVICES

BACKGROUND OF THE INVENTION

1. Field of the Invention

This invention relates to digital-to-analog and analog-to-digital devices; in particular, to systems which utilize the analog form as a common intermediary form between such devices. This invention is particularly applicable to devices such as Digital Video Disks (DVDs), High Definition Televisions (HDTVs), and the like, which utilize a digital form for processing, storing, or displaying the information, and utilize a common intermediary analogy form, such as NTSC or PAL, for communicating the information to each other.

2. Description of Related Art

FIG. 1 shows a system comprised of multiple components, with switching and selection means. Such a system may represent a home electronics center, a recording studio, a multi-media center, etc. The names of the components in the system of FIG. 1 are presented for illustrative purposes only. The components 101 through 108 are interconnected to each other via interconnections 111 through 119. Communications among the components via these interconnections will have a form and format such that each device can accurately receive the information content of these communications. Consider interconnection 115 and switch 105. Interconnection 115 may carry information from either component 106 or 107, via interconnections 116 or 117 respectively, in dependence upon the state of switch 105. Conventionally, to assure that device 104 is able to accurately transmit or receive information to or from the selected component, both components 106 and 107 operate using the same information format. The common information format also allows devices 106 and 107 to communicate with each other, also via switch 105.

Conventionally, commonly accepted formats are employed for the information exchange, so that the components may communicate independent of the particular vendors of the components, and independent of the form of the information utilized within the components. Because newer components must be compatible with legacy components to be marketable, the common formats are often those used before the advent of digital products. For example, if component 106 is a video recorder, component 107 is a video disk, and component 104 is a television, the format of the communications on interconnections 116 and 117 will be NTSC, PAL, or other common analog format. In this manner, via switch 105, components 104, 106, and 107 may communicate to each other as desired.

To effect a conversion to and from analog and digital form, standard digital encoders (DENCs) and decoders (DMSDs) have been developed. The digital encoders convert standard digital signals, such as MPEG encoded video, into standard analog signals, such as NTSC and PAL. The digital decoders, or video input processors, convert standard analog input, such as NTSC and PAL, into standard digital signals, such as MPEG encoded video. By incorporating such a digital encoder and digital decoder into a digital product, compatibility, via the analog standard, can be achieved with another component which conforms to the analog standard, independent of whether the other component is analog or digital. Similar interface components are available for converting audio signals to and from a standard digital form, such as AC-3 (a.k.a. "Dolby Digital"), DTS, S/PDIF, AES/EBU, ADAT, etc.

Digital components are often characterized as having higher quality than their analog counterparts. For example, CDs have the potential for much higher audio quality than cassettes; digitally recorded cassettes have the potential for higher quality than conventional analog cassettes. Similarly, DVDs and HDTVs have the potential for higher quality than VCRs and conventional televisions. These digital components may utilize newer digital formats, such as MPEG, CCIR 601 serial-D1, AC-3, S/PDIF, etc., for communicating digital data directly. Such direct communication minimizes the degradation caused by the conventional conversion of the digital signals to analog, and back to digital, between such digital devices. For example, if component 107 is a video disk, and component 104 is an MPEG-compatible television, the connection 118 could be an MPEG, digital, connection. Note, however, that even with a digital connection 108 for improved quality, components 104 and 107 must also contain an analog interconnection 115, 117 to maintain compatibility with legacy systems. If a device contains both an analog and digital interconnection capability, the selection between the format to be utilized is also required, typically requiring the user to manually select the specific source of the input to and output from each device.

SUMMARY OF THE INVENTION

It is an object of this invention to provide alternative formats for communications between components, and to provide an automatic selection of the preferred format between components.

In accordance with this invention, a supplemental signal is appended to a conventional analog intermediary signal by the transmitting component. This supplemental signal conveys information regarding the alternative formats available from that component. In response to this supplemental signal, the receiving component signals the transmitting component to switch to an alternative format. Thereafter, the transmitting and receiving components communicate via the selected format, bypassing the degradation caused by conversions to and from the analog intermediary format.

In another preferred embodiment, the supplemental format signalling is effected by the receiving component only. Upon detection of this signalling, the transmitting component switches to the alternative format, and the receiving component switches thereafter, upon detection of this alternative format.

In the preferred embodiment, the supplemental signal is appended to the conventional analog formatted signal in a substantially non-interfering manner. In this way, compatibility with a conventional receiving component is maintained. By switching to an alternative format only upon command of the receiving component, the communication from a transmitting component in accordance with this invention is compatible with conventional receiving components as well as receiving components designed in accordance with this invention.

In the preferred embodiment, also, communications in the selected format is via the same interconnection used to communicate the analog intermediary signal. In this manner, no additional interconnections, compared to the conventional interconnections, are required.

DESCRIPTION OP THE PREFERRED EMBODIMENTS

Figure 1:
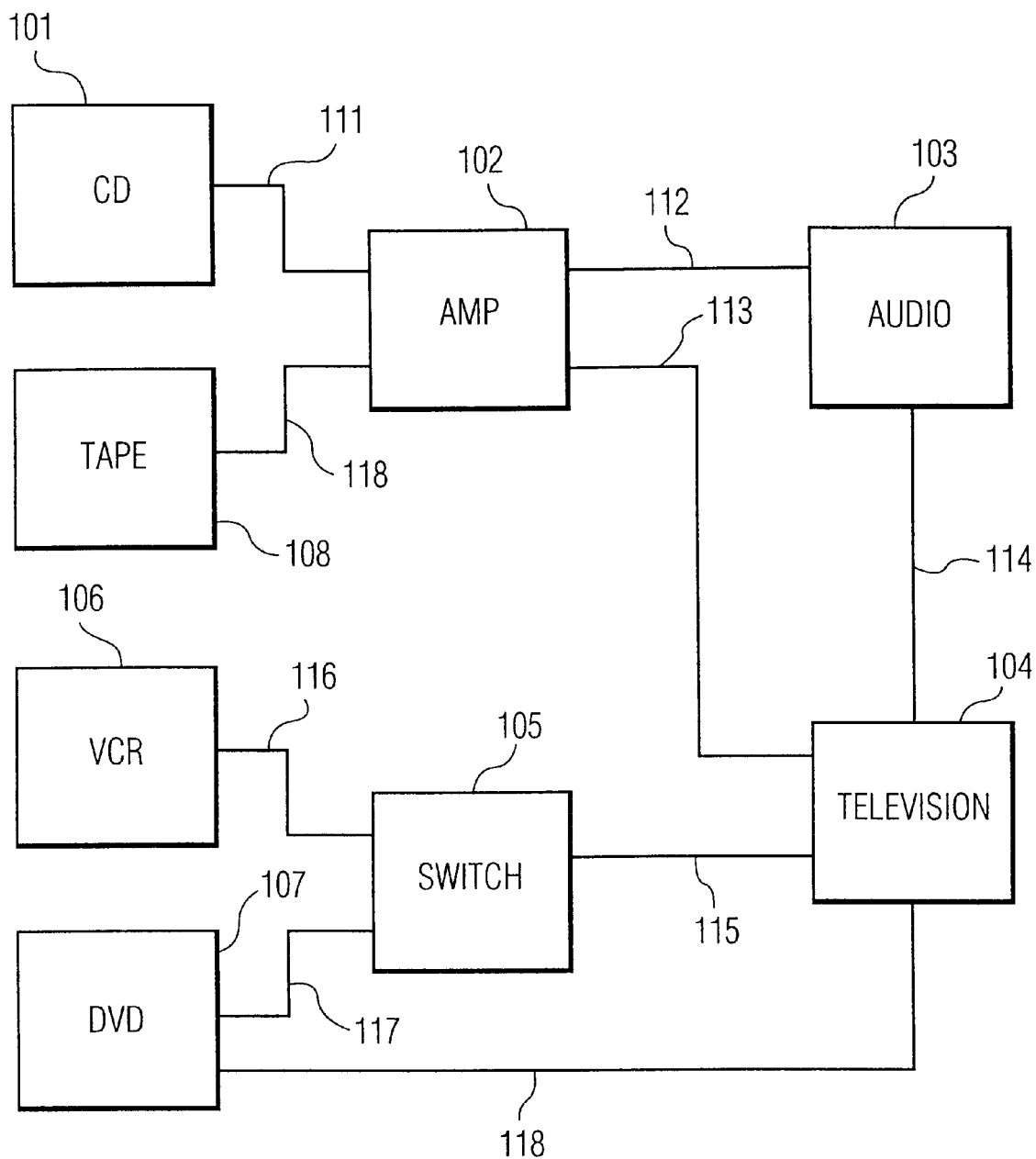
FIG. 1 shows a system comprised of multiple components.
Figure 2A:
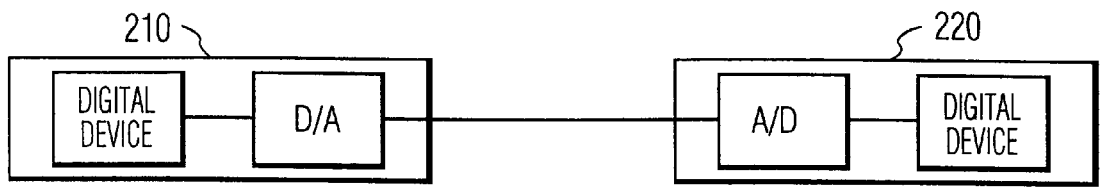
FIG. 2 shows an interconnection of two components, each having a digital internal format and an external analog format.
FIGS. 2b, 2c, and 2d show switching means in accordance with this invention.

FIG. 2a shows the conventional means of interconnecting two digital components 210, 220, utilizing an analog mode interconnection 217. As discussed with reference to FIG. 1, the analog mode interconnection is utilized to assure compatibility among diverse products, and in particular to assure compatibility with legacy analog-only products. The digital components 210, 220 contain digital-to-analog and analog-to-digital converters 216, 218, which convert the output from the digital devices 200, 202 within the components 210, 220 into the common analog intercommunication format on interconnection 217. The connections 211, 217, 219 are shown to be bidirectional, for generality. The D/A and A/D representations of converters 216 and 218 merely show the mode of each device on each input/output to the converter. That is, for example, if device 210 is a digital cassette tape recorder, the converter 216 converts digital information from the digital tape device 200, via interconnect 211, into analog information for playback at component 220 via interconnect 217; it also converts analog information from component 220 via interconnect 217 into digital information for recording to the digital tape device 200 via interconnect 211. As would be evident to one skilled in the art, a unidirectional device, such as a CD player, would not require such bidirectional capabilities, and the converter 216 need merely convert the digital data from the CD into analog mode information, such as audio frequency signals. For convenience, the D/A and A/D converters will be referred to herein as analog converters.

Figure 2B:
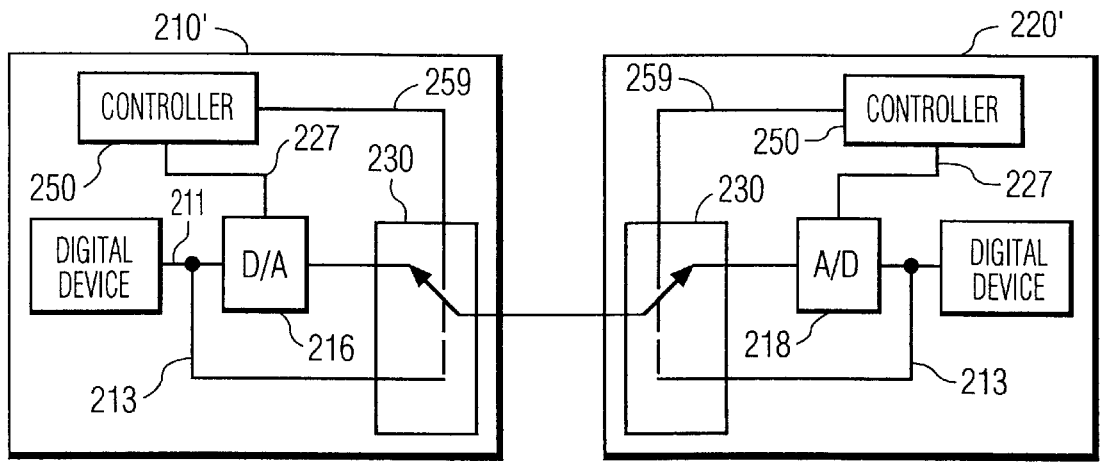

FIG. 2b shows two digital components 210' and 220' with analog mode bypass capabilities, in accordance with this invention. Each component contains a switch 230, and an associated controller 250. The digital devices 200, 202 are connected directly to one input of the switch, via interconnection 213, and indirectly to the other input of the switch via the analog converters 216, 218. The default position of the switch 230 connects the analog converter to the interconnection 217 between the components. That is, unless switched by the controller 250, the interconnection of the components 210' and 220' utilizes the same analog format as the conventional components 210 and 220 in FIG. 2a.

Figure 2C:
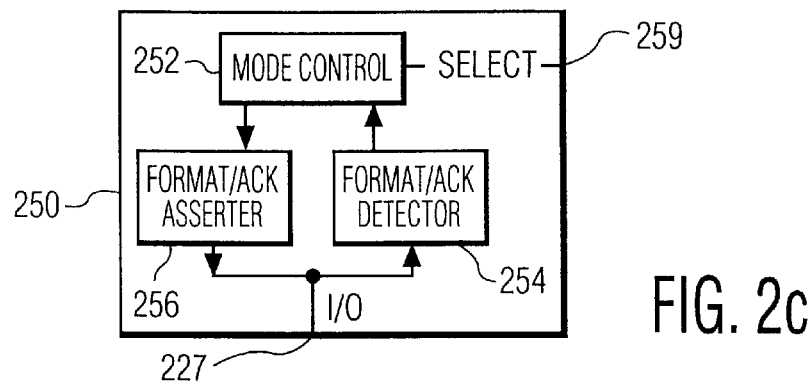

The controller 250 is connected to the analog converter via interconnection 227. Controller 250 is detailed in FIG. 2c. The controller 250 consists of a mode control 252, a format/ACK detector 254, and a format/ACK asserter 256. In operation, the format/ACK asserter 256 of one component, the transmitter, will inform another component that it is able to provide an alternative format. The format/ACK detector 254 in the other component, the receiver, will detect the occurrence of this formatting signal. If the receiving component has the ability to accept this alternative format, the format/ACK asserter 256 of the receiver will signal an acknowledgement to the transmitter. Upon transmission and receipt of the asserted acknowledgement, the mode control 252 of both components 210' and 220' will control each switch 230 in these components so as to directly connect the outputs of the digital devices 200, 202, via interconnection 217.

Figure 2D:
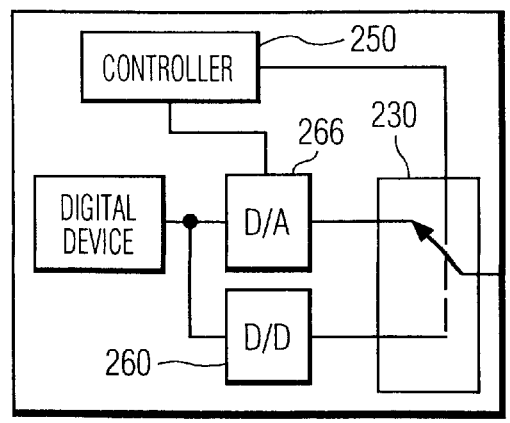

Alternative configurations are also within the spirit of this invention. The digital signal may be reformatted into a different digital form, better suited for transmission. For example, the digital form of the information storage within the digital device may be binary encoded; to minimize EMI (ElectroMagnetic Interference) the information may be transmitted utilizing a quadrature encoding, such as QAM. Similarly, the digital information may be stored as words, but transmitted as bits, with additional signalling for synchronization. Shown in FIG. 2d is a digital format converter 260 which will perform the appropriate digital to digital reformatting between the storage format and transmission format. Note also that the switch 230 may be a distributed switch, in that the outputs of the individual devices 266, 260 may be wired together, and the switching between the devices is effected by enabling and disabling the appropriate devices alternately. In like manner, devices 266 and 260 may be integrated within a single "digital to analog or digital" converter, or a single "analog or digital to digital" converter. These and other alternative configurations would be evident to one skilled in the art, and are within the spirit and scope of this invention.

In the preferred embodiment, interconnection 217 is utilized to transfer information between components, as well as to communicate the above format signalling. As noted above, the information to be transferred is, typically, television signals, in NTSC or PAL form, or audio signals, in the audio frequency band. In accordance with this invention, the format-signalling must be effected without substantially interfering with the information signal. Any number of non-interfering multiplexing techniques may be employed. In the preferred embodiment, a form of time-division multiplexing scheme is employed. The format-signalling is effected during "gap" periods of time in the information signal. In television signalling, for example, the format-signalling occurs during the video blanking periods, either between each video line, or between each video frame. In audio signalling, the format-signalling occurs during audio blank periods, for example in the pauses between songs in an audio recording. Alternatively, the format-signalling can be effected via frequency multiplexing, wherein the format-signalling occurs at a frequency which is routinely filtered by the information processing device. A combination of frequency and time division multiplexing may also be employed, so that format-signalling does not produce discernible aberrations, such as audible static, during the gap periods.

FIG. 3 shows a timing diagram of a preferred embodiment for format-signalling during the vertical sync portion of an analog video signal, such as NTSC. The conventional vertical sync portion is shown in FIG. 3a. The first three time periods in a frame are equalization pulse 301–306. These pulses occur at twice the horizontal frequency and are utilized for the 2:1 interlace typically of conventional NTSC and PAL formatted television. These, or similar, pulses are present in non-interlaced formats as well.

Figure 3A:
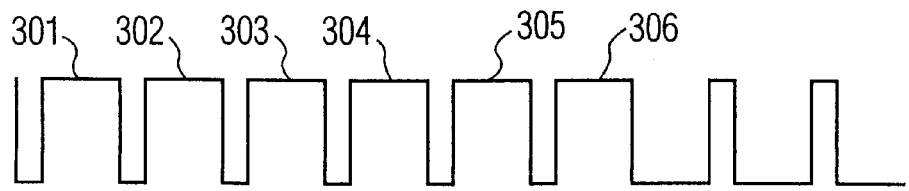
FIG. 3 shows a timing diagram for providing supplemental signalling within an NTSC signal, in accordance with this invention.
Figure 3B:
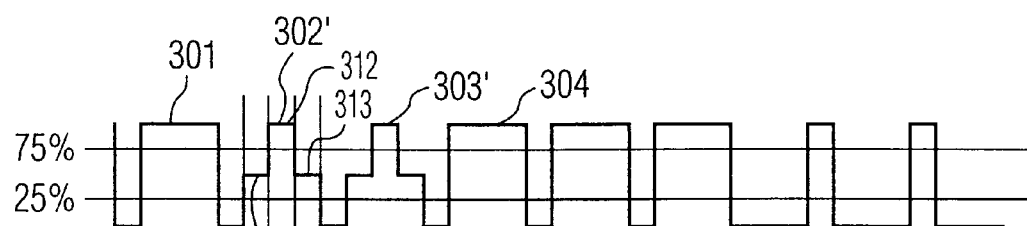

In accordance with this invention, one or more of the conventional pulses used for equalization or other synchronization tasks are modified in the format/ACK asserter 256 of the transmitting component of FIG. 2. Pulse 302 in FIG. 3a is shown in a modified form as pulse 302' in FIG. 3b. The pulse 302' consists of three segments 311, 312, and 313. The amplitude of segments 311 and 313 are limited to approximately half the peak amplitude of segment 312.

Using conventional data slicing techniques, the modified pulse 302' can be decoded in the format/ACK detector 254 of the receiving component of FIG. 2 with two data slicers.

Figure 3C:
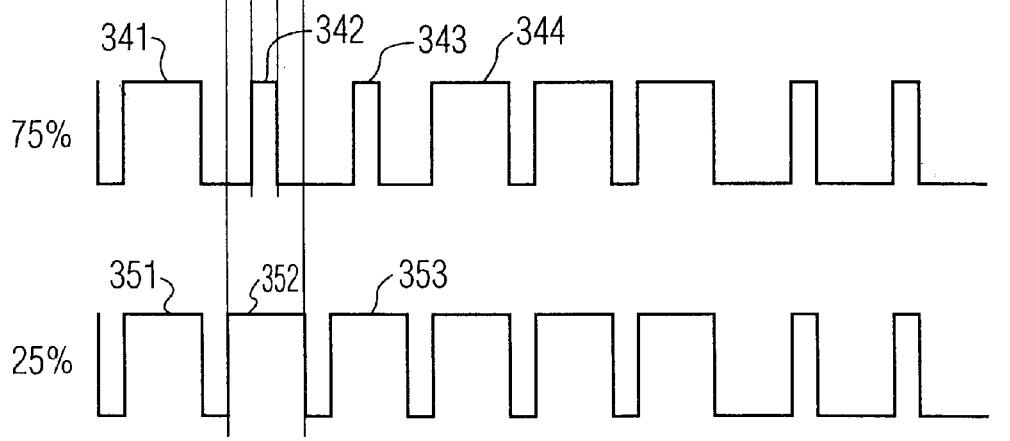

With slice levels set at 25% and 75% respectively, the data slicers will produce the waveforms shown in FIG. 3c. As can be seen, the output from each data slicer produces different output pulses 342, 352 corresponding to the modified pulse 302'. The format/ACK detector 254 also comprises a means for comparing these pulses, and, if a substantive difference is detected, the detector 254 will signal the mode controller 252 that the transmitting device is capable of transmitting an alternative format.

Figure 3D:
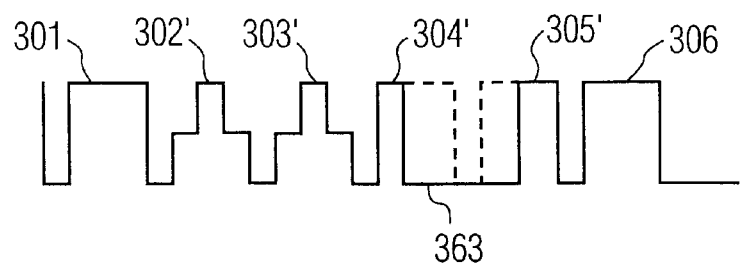

In response to the detection of an alternate format capability, the mode controller 252 will signal an acknowledgement to the transmitting component. Any number of signalling techniques may be employed for this acknowledgement. The acknowledgement may be encoded in the same manner as the format signalling discussed above. Alternatively, to minimize complexity in the preferred embodiment, the Format/ACK asserter of the receiving component will be configured in a conventional wired-AND or wired-OR configuration. The receiving component forces, or clamps, the received signal to a specified level, such as ground, for a specified duration, as shown in FIG. 3d, at 363. The transmitting component will attempt to pull the signal to the other level, at 304 and 305, and its format/ACK detector 254 will detect the fact that the line is being clamped to a level different than driven, producing the modified waveform at 304' and 305'. Detecting the clamping, the detector 254 will signal the acknowledgement to the mode control 252.

Having communicated and acknowledged the ability to transmit and receive an alternative format, the mode control 252 of the transmitting and receiving components will assert the select signal 259 and toggle switch 230, thereby bypassing the analog conversion of the signal.

As would be evident to one skilled in the art, alternative format-signalling techniques may be utilized. For example, if multiple formats are available, the above signalling technique may be applied to combinations of equalizing or synchronization pulses, each particular combination being associated with a specified format. In the audio realm, format signalling during the gaps between songs may be effected by using, for example, an AC signal well above the audio frequency range, or a DC level shift well below the audio frequency range. The presence of the high frequency AC carrier signal, or the occurrence of a DC level shift, will signal the alternative format capability. The same signalling means used for format-signalling may also be used for acknowledgement as well. In accordance with this invention, a format-signalling convention or standard will be adopted, and thereafter each component which conforms to this convention will be able to bypass the degradation caused by the conversion from digital to analog and back again to digital.

Figure 4A:
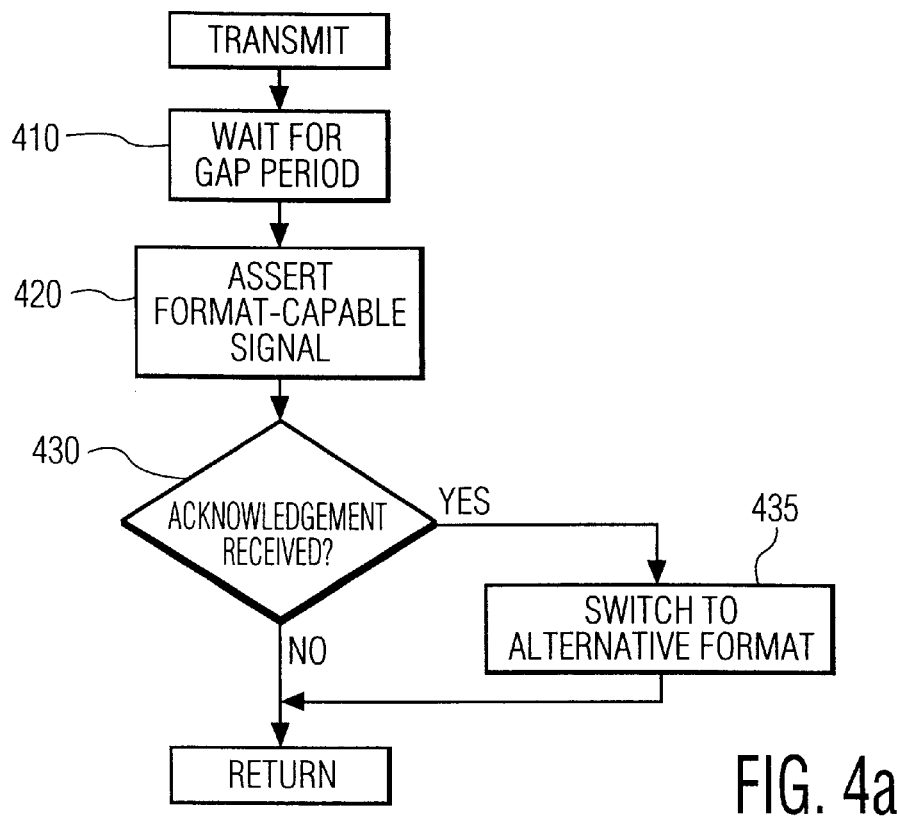
FIG. 4 shows a flow chart for selectively bypassing the analog mode in accordance with this invention.

FIG. 4 shows a flow chart for the automated bypass of analog mode conversions, in accordance with this invention. FIG. 4a shows the flowchart for the transmitting component, and 4b shows the flowchart for the receiving component. A component, such as a digital tape recorder, which can operate in both transmit (playback) and receive (record) modes, would execute the appropriate flowchart in dependence upon its current operational mode.

In FIG. 4a, the transmitting component will wait until the appropriate gap period, such as between video frames or between audio segments, at 410. Thereafter, it will assert the specified format-capable signal, at 420. It will then monitor the line to determine if the receiving component acknowledges this format-capable signal, at 430. If the format-capable signal is acknowledged, the transmitting component will switch to the alternative, typically digital, format, at 435. This process will be repeatedly executed while the component is in the default analog format. Upon switching to digital, the switch back to analog format can be triggered using a number of means; for example, the above referenced convention or standard may specify that upon any change to the transmitter, such as power on/off, or a change of media, the transmitting component will revert to the default analog format. Alternatively, the digital format may contain an explicit messaging form for periodically confirming communications; each component could be configured to revert to the default analog format upon any loss of confirmation.

Figure 4B:
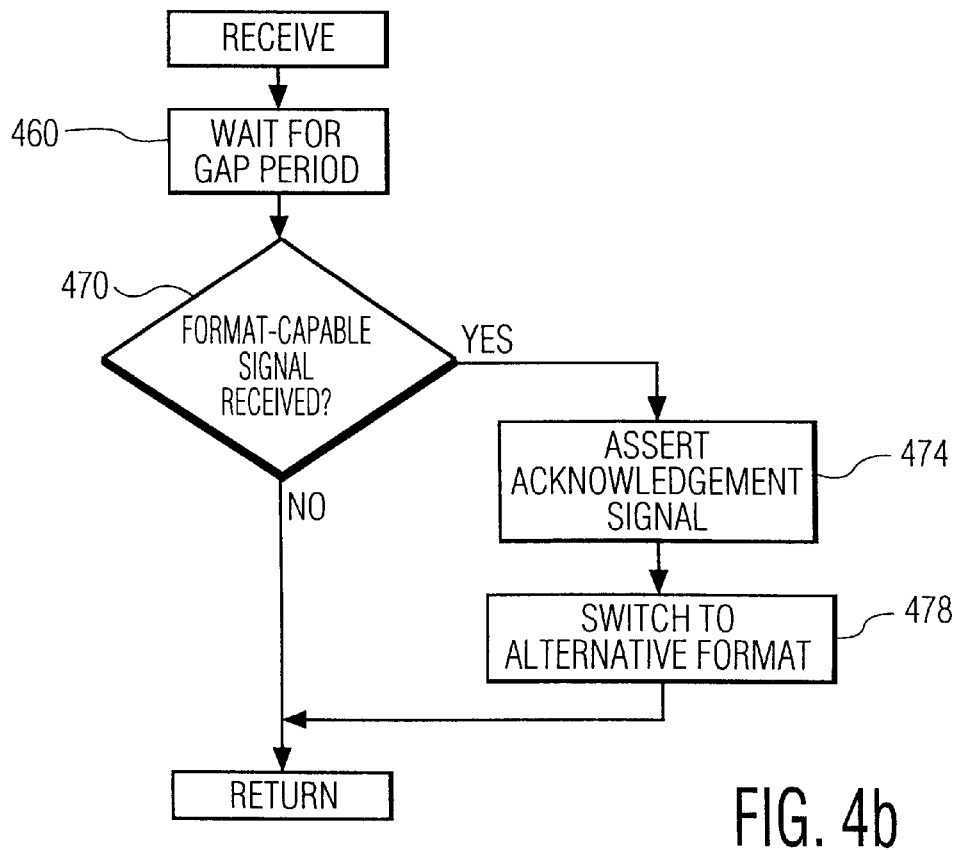

In FIG. 4b, the receiving component will wait for the gap in the analog signal, at 460, and then determine whether the format-capable signal is received from the transmitter, at 470. If the format-capable signal is particularly unique, such that a similar signal would never occur during the non-gap periods, the block 460 may be eliminated. If the format-capable signal is received, the receiving component signals an acknowledgement, at 474, and switches to the alternative format, at 478. As discussed above, if the state of the receiving component changes, or if communications from the transmitter are interrupted, the receiving component will revert to the default analog mode. In the default analog mode, the receiving component will periodically or continually execute the flowchart of FIG. 4b.

The capabilities described herein may be implemented in hardware, or software, or a combination of both. In the preferred embodiment, existing digital encoder and digital decoder ICs will be modified to include the switch 230 and its associated controller 250, as shown in FIG. 2. In this manner, existing components can be provided with this improved capability by merely replacing the digital encoder and decoder ICs with ICs with analog bypass capabilities in accordance with this invention.

Although the preferred embodiment calls for explicit format signalling and format acknowledgement, an implicit signalling technique may also be employed. Explicit signalling provides for an assurance that the format will not be switched in error, wheras implicit signalling will require fewer components. With implicit signalling, the receiving component is configured to signal that it is able to accept an alternative format whenever it receives the default format. This signalling may be effected by the relatively simple wired-AND or wired-OR technique discussed above, and will occur independent of the transmitting component. That it, the transmitting component need not explicitly signal that it is able to transmit in the alternative format. If the transmitting component is able to transmit in the alternative format, it will switch to this alternative format upon detecting the format signalling from the receiving component. The receiving component will detect this change of format, and will thereafter switch to this format.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. An apparatus for communicating information to a receiver via a component interconnection, said receiver having an ability to communicate a format-capable acknowledgement to said apparatus via the component interconnection, said apparatus comprising:

a digital device having an output in digital form;

an analog converter coupled to said digital device;

a switch responsive to a control signal for connecting one of either the output of the analog converter or the output of the digital device to the component interconnection; and a controller for generating said control signal, said controller having a format detector for detecting a format of a signal, a format-capable signal and the format-capable acknowledgement, and wherein said controller transmits to said receiver the format-capable signal indicating an alternative format for communication and to allow communication to said receiver via said alternative format.

2. An apparatus as claimed in claim 1, wherein the controller also comprises a format asserter for communicating the format-capable signal to the port, for transmission to the receiver via the analog converter.

3. An apparatus as claimed in claim 2, wherein the information being communicated is a sequence of video frames having a gap of time between each frame, and the communication of the format-capable signal and the format-capable acknowledgement occurs during this gap.

4. An apparatus as claimed in claim 2, wherein the information being communicated is a sequence of audio pieces having a gap of time between each piece, and the communication of the format-capable signal and the format-capable acknowledgement occurs during this gap.

5. An apparatus as claimed in claim 1, wherein the detection of the format-capable acknowledgement is effected by detecting a clamped voltage upon the component interconnection.

6. A digital encoder comprising:

an input for receiving digital data;

a communications port for communicating a transmitted signal comprised of an information signal having a format and a format-capable signal indicating an alternative format for communication, and for receiving a format-capable acknowledgement signal;

an analog converter for converting the digital data at the input to an analog signal;

a digital converter for converting the digital data at the input to a digital signal;

a switch having:
a first input connected to the analog signal,
a second input connected to the digital signal,
an output connected to the communications port, and
a control input for connecting the output to one of either the first input or the second input; and, a controller comprising:
a format detector for detecting the format-capable acknowledgement signal, and,
a mode control for asserting a control signal on the control input of the switch so as to allow communication via said alternative format upon the detection of the format-capable acknowledgement signal.

7. A digital encoder as claimed in claim 6, wherein the controller also comprises a format asserter for creating the format-capable signal.

8. An apparatus for receiving information from a transmitter via a component interconnection, said transmitter having an ability to communicate a transmitted signal having a format to said apparatus via the component interconnection, said apparatus comprising:

a switch comprising:
an input connected to the component interconnection,
a first output,
a second output, and
a control input for connecting said switch input to one of either the first output or the second output;

a digital device having a first input connected to the first output of the switch;

an analog converter comprising:
an input connected to the second output of the switch, and
an output connected to a second input of the digital device;

a controller connected to the analog converter and comprising:
a control output connected to the control input of the switch, and
a format asserter for communicating a format-capable acknowledgement to the port; and
is configured to assert the control output so as to allow communication via an alternative format for communication, in dependence upon a format-cable signal, indicating said alternative format, in said transmitted signal.

9. An apparatus as claimed in claim 8, wherein the controller also comprises a format-detector for detecting the format-capable signal within the transmitted signal, and the assertion of the control output is dependent upon the detection of the format-capable signal.

10. An apparatus as claimed in claim 9, wherein the information being communicated is a sequence of video frames having a gap of time between each frame, and the communication of the format-capable signal and the format-capable acknowledgement occurs during this gap.

11. An apparatus as claimed in claim 9, wherein the information being communicated is a sequence of audio pieces having a gap of time between each piece, and the communication of the format-capable signal and the format-capable acknowledgement occurs during this gap.

12. An apparatus as claimed in claim 11, wherein the format-capable acknowledgement is effected by clamping the component interconnection to a fixed voltage level.

13. A digital decoder comprising:

a communications port for receiving a transmitted signal comprised of an information signal having a format and a format-capable signal indicating an alternative format for communication, and for transmitting a format-capable acknowledgement signal;

an output;

an analog converter having an input and an output, a digital converter having an input and an output, a switch having:
an input connected to the communications port,
a first output connected to the input of the analog converter,
a second output connected to the input of the digital converter, and
a control input for connecting the switch input to one of either the first switch output or the second switch output; and, a controller connected to the analog converter, comprising:
a format asserter for creating the format-capable acknowledgement signal, and a mode control for asserting a control signal on the control input of the switch so as to allow communication via said alternative format in dependence upon the format-capable signal.

14. A digital decoder as claimed in claim 13, wherein the controller having, a format detector for detecting the format-capable signal, and the control signal is asserted in dependence upon the detection of the format-capable signal.

* * * * *